US008601251B2

(12) United States Patent  (10) Patent No.: US 8,601,251 B2
Matsui  (45) Date of Patent: Dec. 3, 2013

(54) INTEGRATED CIRCUIT WITH INDEPENDENTLY POWERED PROCESSORS BOOTED SEQUENTIALLY, WHILE SHARING A COMMON MEMORY UNIT FOR LOADING PROGRAMS ONTO PROCESSORS AFTER BOOTING

(75) Inventor: Hisami Matsui, Kyoto (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 13/307,285

(22) Filed: Nov. 30, 2011

(65) Prior Publication Data

US 2012/0072712 A1    Mar. 22, 2012

Related U.S. Application Data

(63) Continuation of application No. PCT/JP2009/007236, filed on Dec. 25, 2009.

(30) Foreign Application Priority Data

Jun. 3, 2009  (JP) ................................. 2009-134493

(51) Int. Cl.
*G06F 15/167* (2006.01)

(52) U.S. Cl.
USPC ............................................................ 713/2

(58) Field of Classification Search
USPC ............................................................ 713/2
See application file for complete search history.

(56) References Cited

U.S. PATENT DOCUMENTS

| 8,131,985 | B2* | 3/2012 | Kwon et al. | ...................... 713/1 |
| 2002/0053073 | A1 | 5/2002 | Shimamoto | |
| 2004/0117678 | A1* | 6/2004 | Soltis et al. | ................... 713/320 |
| 2008/0148034 | A1* | 6/2008 | Henry et al. | ....................... 713/1 |

FOREIGN PATENT DOCUMENTS

| JP | 2000-152101 | 5/2000 |
| JP | 2002-140204 | 5/2002 |
| JP | 2003-330902 | 11/2003 |
| JP | 2005-218046 | 8/2005 |
| JP | 2006-202200 | 8/2006 |
| JP | 2007-241464 | 9/2007 |
| JP | 2008-059052 | 3/2008 |
| JP | 2008-130036 | 6/2008 |

OTHER PUBLICATIONS

International Search Report and Written Opinion for PCT/JP2009/007236, dated Feb. 9, 2010, along with an english translation of ISR.

* cited by examiner

*Primary Examiner* — Thomas Lee
*Assistant Examiner* — Danny Chan
(74) *Attorney, Agent, or Firm* — McDermott Will & Emery LLP

(57) ABSTRACT

The present invention provides a low-cost semiconductor integrated circuit on which two CPUs are mounted. The semiconductor integrated circuit integrated in a single chip includes a standby microcomputer, a main microcomputer, and a block circuit which blocks a signal between both microcomputers. The standby microcomputer includes a first Read Only Memory (ROM) which stores a first boot program and a first processing unit which executes the first boot program. The main microcomputer includes a second ROM which stores a second boot program and a second processing unit which executes the second boot program. The first processing unit executes the first boot program when the first power source is switched ON, while the second processing unit executes the second boot program when the second power source is switched ON.

13 Claims, 14 Drawing Sheets

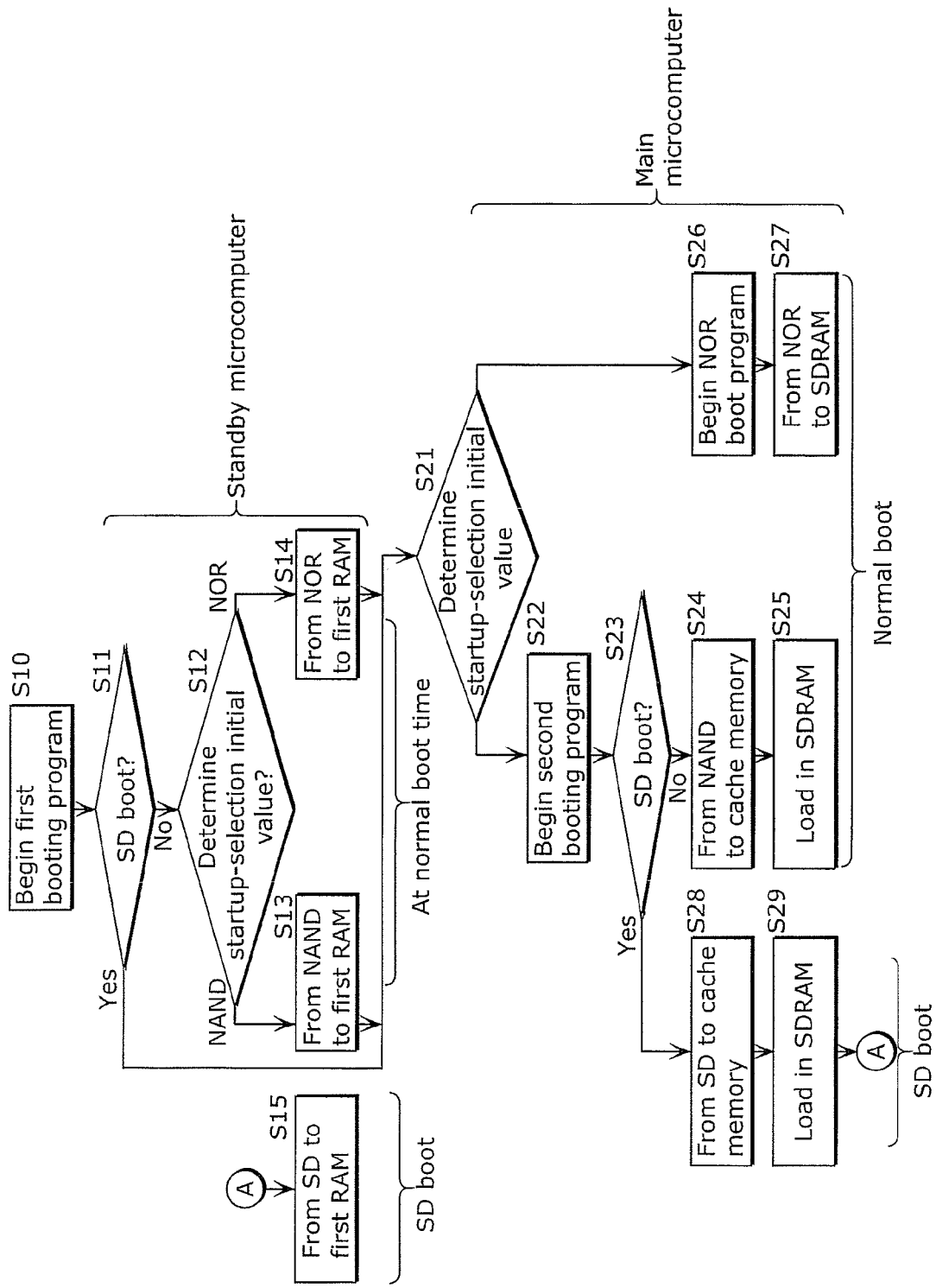

FIG. 7

| External memory and contents thereof | NAND (STMprog., BEboot, BEprog.,) | |
|---|---|---|
| CPU | STM (Standby microcomputer) | BE (Main microcomputer) |
| (A) At normal boot time<br>(a) Normal setting function | Initial value : NAND, 1a<br>(1) Boot first ROM<br>　　Forward from NAND to first RAM<br>(2) Execute first RAM | (3) Boot second ROM<br>　　Forward from NAND to second RAM<br>(4) Execute second RAM<br>　　Forward from NAND to SDRAM<br>(5) Execute SDRAM |
| (b) Write from SD to Flash memory (Copy SD) | Initial value : NAND, 1b<br>(1) Boot first ROM<br>　　Forward from NAND to first RAM<br>(2) Execute first RAM | (3) Boot second ROM<br>　　Forward from NAND to second RAM<br>(4) Execute second RAM<br>　　Forward from SD to SDRAM<br>(5) Execute SDRAM<br>　　Forward from SD to NAND |
| (c) Execute BE program (service, step check) | | (3) Boot second ROM<br>　　Forward from NAND to second RAM<br>(4) Execute second RAM<br>　　Forward from SD to SDRAM<br>(5) Execute SDRAM |

FIG. 8

| External memory and contents thereof | NOR (STMprog., BEboot, BEprog.,) | | BE (Main microcomputer) |
|---|---|---|---|
| CPU | STM (Standby microcomputer) | | |
| (A) At normal boot time<br>(a) Normal setting function | Initial value : NOR, 1a | | |
| | (1) Boot first ROM<br>Forward from NOR to first RAM<br>(2) Execute first RAM | | (1) Boot NOR directly<br>Forward from NOR to SDRAM<br>(2) Execute SDRAM |
| (b) Write from SD to Flash memory (Copy SD) | Initial value : NOR, 1b | | |
| | (1) Boot first ROM<br>Forward from NOR to first RAM<br>(2) Execute first RAM | | (3) Boot NOR directly<br>Forward from SD to NOR |
| (c) Execute BE program (service, step check) | | | (3) Boot NOR directly<br>Forward from SD to SDRAM<br>(4) Execute SDRAM |

FIG. 9

| External memory and contents thereof | ROM (STMprog., BEboot, BEprog.,) | | |
|---|---|---|---|
| CPU | STM (Standby microcomputer) | BE (Main microcomputer) |
| (A) At normal boot time<br>(a) Normal setting function | Initial value : ROM, 1a<br><br>(1) Boot first ROM Forward from ROM to first RAM<br>(2) Execute first RAM | (1) Boot ROM directly Forward from NAND to SDRAM<br>(2) Execute SDRAM |
| (b) Write from SD to Flash memory (Copy SD) | Initial value : ROM, 1b<br><br>(1) Boot first ROM Forward from ROM to first RAM<br>(2) Execute first RAM | (3) Boot ROM directly Forward from SD to NAND |
| (c) Execute BE program (service, step check) | | (3) Boot ROM directly Forward from SD to SDRAM<br>(4) Execute SDRAM |

FIG. 10

| External memory and contents thereof | NAND (STMprog., BEboot, BEprog.,) | |
|---|---|---|
| CPU | STM (Standby microcomputer) | BE (Main microcomputer) |
| (B) At SD boot time<br>(a) Write from SD to Flash memory | Initial value : NAND, 2a<br>(1) Boot first ROM<br>Not forward to first RAM<br>(4) Execute STM program in SDRAM after forward to SDRAM in BE<br>Forward from SDRAM (SD) to first RAM according to address information<br>(5) Execute first RAM (DIAG) | (2) Boot second ROM<br>Forward from SD to second RAM<br>(3) Execute RAM<br>Forward from SD to SDRAM<br>(6) Execute SDRAM<br>Forward from SD to NAND |
| (b) Execute STM & BE programs in SD card (service, step check) | | (2) Boot second ROM<br>Forward from SD to second RAM<br>(3) Execute RAM<br>Forward from SD to SDRAM<br>(6) Execute SDRAM |

FIG. 11

| External memory and contents thereof | NOR (STMprog., BEboot, BEprog.,) | |
|---|---|---|
| CPU | STM (Standby microcomputer) | BE (Main microcomputer) |
| | Initial value : NOR, 2a | |
| (B) At SD boot time<br>(a) Write from SD to Flash memory | (1) Boot first ROM<br>Forward from NOR to first RAM<br>(2) Execute first RAM | (3) Boot NOR directly<br>Forward from SD to NOR |
| (b) Execute STM & BE programs in SD card (service, step check) | | (3) Boot NOR directly<br>Forward from SD to SDRAM<br>(4) Execute SDRAM |

FIG. 12

| External memory and contents thereof | ROM (STMprog., BEboot, BEprog.,) | |
|---|---|---|
| CPU | STM (Standby microcomputer) | BE (Main microcomputer) |
| | Initial value : ROM, a | |
| (B) At SD boot time<br>(a) Write from SD to Flash memory | (1) Boot first ROM<br>　Forward from ROM to first RAM<br>(2) Execute first RAM | (1) Boot ROM directly<br>　Forward from SD to NAND |
| (b) Execute STM & BE programs in SD card (service, step check) | | (1) Boot ROM directly<br>　Forward from SD to SDRAM<br>(2) Execute SDRAM |

INTEGRATED CIRCUIT WITH INDEPENDENTLY POWERED PROCESSORS BOOTED SEQUENTIALLY, WHILE SHARING A COMMON MEMORY UNIT FOR LOADING PROGRAMS ONTO PROCESSORS AFTER BOOTING

CROSS REFERENCE TO RELATED APPLICATION

This is a continuation application of PCT Patent Application No. PCT/JP2009/007236 filed on Dec. 25, 2009, designating the United States of America, which is based on and claims priority of Japanese Patent Application No. 2009-134493 filed on Jun. 3, 2009. The entire disclosures of the above-identified applications, including the specifications, drawings and claims are incorporated herein by reference in their entirety.

BACKGROUND OF THE INVENTION (1) Field of the Invention

The present invention relates to semiconductor integrated circuits which include two CPUs, in particular, to a semiconductor integrated circuit provided in a television receiver, a video and audio reproducing apparatus, a video and audio recording apparatus, and other apparatuses, and to a television.

(2) Description of the Related Art

The patent reference 1 (Japanese Unexamined Patent Application Publication No. 2008-59052) discloses a microcomputer which includes a main CPU and a sub CPU. FIG. 14 is a block diagram showing a configuration of a microcomputer MCU according to a related art. The MCU includes a nonvolatile memory 4, a controller 105, and a main CPU 2. The controller 105 includes a sub CPU (FCPU) 112 which stores a controlling program. The controlling program is executed to implement writing in and/or deletion from the nonvolatile memory 4. The writing and/or deletion controlling program is to be transferred from the nonvolatile memory 4 to a control RAM 15. One of the controller 105 and the FCPU 112 both of which are responsive to a request from the main CPU 2 implements the transferring.

As such, the sub CPU 112 in the controller 105 implements the program control so as to control the writing in and/or deletion from the nonvolatile memory 4, intending to improve real-time capability of the MCU, and to shorten a time-period required for an execution of a user program stored in the nonvolatile memory 4 by the main CPU.

SUMMARY OF THE INVENTION

However, according to the above related art, an electrically writable-in and deletable-from nonvolatile memory module (i.e., a flash memory) is mounted in a semiconductor integrated circuit, causing a manufacturing cost to increase. This is because a process of embedding the flash-memory onto a semiconductor integrated circuit is hardly realized in a present miniaturized process. Even if the flash-memory can be embedded in the semiconductor integrated circuit, a manufacturing process is complicated, thereby increasing the manufacturing cost.

An object of the present invention is to provide a low-cost semiconductor integrated circuit which includes two CPUs without embedding the flash memory, and a television.

In order to solve the above problems, a semiconductor integrated circuit according to an aspect of the present invention is integrated in a single chip and includes: a standby microcomputer which receives power supply from a first power source; a main microcomputer which receives power supply from a second power source independent from the first power source; and a block circuit which blocks a signal input from the standby microcomputer to the main microcomputer when the first power source is switched ON and the second power source is switched OFF. The standby microcomputer includes a first Read Only Memory (ROM) which stores a first boot program and a first processing unit which executes the first boot program. The main microcomputer includes a second ROM which stores a second boot program and a second processing unit which executes the second boot program. The first processing unit executes the first boot program when the first power source is switched ON so as to switch ON the second power source and to load the first program from an external nonvolatile memory, and to execute the loaded first program. The second processing unit executes the second boot program when the second power source is switched ON so as to load the second program from the external nonvolatile memory, and to execute the loaded second program.

According to this configuration, the standby microcomputer and the main microcomputer respectively load the first and the second programs at boot time (at starting-up). Therefore, no flash memory needs to be embedded inside the semiconductor integrated circuit, thereby realizing cost reduction.

Furthermore, the standby microcomputer and the main microcomputer respectively receive power supply from the power sources independent from each other, while sharing the external nonvolatile memory working as a program-supplying source at the boot time. Accordingly, a circuit configuration can be simplified in comparison with the case that the program-supplying source is separately arranged. This configuration is appropriate for the cost reduction.

The main microcomputer may include a memory interface which receives the power supply from the second power source, the memory interface may be connected to the external nonvolatile memory outside the single-chip semiconductor integrated circuit and to an external volatile memory outside the single-chip semiconductor integrated circuit, and the external nonvolatile memory may store the first program and the second program which are to be loaded.

According to the configuration, the memory interface receives the poser supply from the second power source shared by the main microcomputer. Accordingly, power consumption in the memory interface can be reduced while the standby microcomputer is switched ON and the main microcomputer is switched OFF.

The standby microcomputer may include a first Random Access Memory (RAM) which is volatile, the first processing unit may execute the first boot program so as to load the first program from the external nonvolatile memory to the first RAM through the memory interface, and the second processing unit may execute the second boot program so as to load the second program from the external nonvolatile memory to the external volatile memory through the memory interface.

According to the configuration, the standby microcomputer has therein the first RAM, and thus, is highly independent from the main microcomputer. The main microcomputer executes the second program loaded in the external volatile memory, thereby being capable of executing a larger-scale program.

The first processing unit may control an ON/OFF state of the second power source and startup/stop of the main microcomputer by: initiating the execution of the first boot program when the first power source is switched ON; switching ON the second power source; stopping the main microcomputer; placing the block circuit in an enabled state; loading the first program; initiating the execution of the loaded first program; and executing the first program.

According to the configuration, the standby microcomputer can easily switch ON/OFF the main microcomputer after the start-up.

The external nonvolatile memory may be a NAND flash memory, and the first processing unit may issue, to the memory interface, a read command to read out the first program from the external nonvolatile memory on a block basis so as to load the first program.

The external nonvolatile memory may be a NOR flash memory, and the first processing unit may issue, to the memory interface, a read command to read out the first program from the external nonvolatile memory on plural-bytes basis so as to load the first program.

According to the configuration, the external nonvolatile memory can use either the NAND flash memory accessed on a block basis or the NOR flash memory accessed on a byte basis.

The memory interface may be further connected to a memory card, the memory card may store at least one of an updated first program and an updated second program, and the second processing unit may execute the second program so as to make a copy of at least one of the updated first program and the updated second program from the memory card to the external nonvolatile memory.

According to the configuration, the main microcomputer can facilitate the update of the first program or the second program which are stored in the external nonvolatile memory.

The memory interface may be further connected to the memory card, the memory card may store at least one of the updated first program and the updated second program, and the first processing unit may execute the first program so as to make a copy of at least one of the updated first program and the updated second program from the memory card to the external nonvolatile memory.

According to the configuration, the standby microcomputer can facilitate the update of the first program or the second program which are stored in the nonvolatile memory.

The memory interface may be further connected to the memory card, the memory card may store at least one of the updated first program and the updated second program, the main microcomputer may further include an initial-parameter acquiring unit which acquires an initial parameter for boot, and the second processing unit may execute the second boot program when the initial parameter is a first value so as to load the second program from the external nonvolatile memory to the external volatile memory through the memory interface, and execute the second boot program when the initial parameter is a second value so as to load the updated second program from the memory card to the external volatile memory through the memory interface.

According to the configuration, the source of the boot can be switched between the external nonvolatile memory and the memory card, depending on the value of the initial parameter. The boot implemented from the memory card instead of the external nonvolatile memory (i.e., the first program and the second program are loaded from the memory card) can be used in debug operation in a program-development phase, for example. This facilitates the debug operation.

The memory interface may be connectable to either the NAND flash memory or the NOR flash memory, as the external nonvolatile memory, and the second processing unit may further execute the second boot program when the initial parameter is the second value, so as to make a copy of at least one of the updated first program and the updated second program from the memory card to the external volatile memory through the memory interface.

According to the configuration, the second program stored in the external volatile memory can be updated, after being booted from the memory card. For example, one or both of the first program and the second program can be stored in the external nonvolatile memory after being booted from the memory card under the condition that the external nonvolatile memory is in an initial state (empty state) immediately after the manufacture of the semiconductor integrated circuit.

The memory interface may be further connected to the memory card, the memory card may store at least one of the updated first program and the updated second program, the main microcomputer may include an initial-parameter acquiring unit which acquires an initial parameter for boot, and the second processing unit may determine whether a loading source of the second program is the external nonvolatile memory or the memory card, and determine whether the nonvolatile memory is the NAND flash memory or the NOR flash memory, according to a value of the initial parameter, so as to load the second program based on the determination result.

According to the configuration, any one of the NAND flash memory, the NOR flash memory, and the memory card can be selectively used as the loading source of the second program. Therefore, configuring the system can be flexibly performed.

The main microcomputer may include the memory interface, the memory interface may be connected to the external nonvolatile memory outside the single-chip semiconductor integrated circuit and the external volatile memory outside the single-chip semiconductor integrated circuit, the first processing unit may execute the first boot program so as to load the first program from the external nonvolatile memory to the external volatile memory, and the second processing unit may execute the second boot program so as to load the second program from the external nonvolatile memory to the external volatile memory.

According to the configuration, the standby microcomputer and the main microcomputer respectively execute the first and the second programs which are loaded on the external volatile memory.

A television for solving the above problems includes the semiconductor integrated circuit, and the main microcomputer executes the second program so as to reproduce a digital broadcasting.

According to the present invention, no flash memory needs to be embedded inside the semiconductor integrated circuit, thereby realizing the cost reduction.

Furthermore, the external nonvolatile memory serving as the program-supplying source at the boot time is shared by the standby microcomputer and the main microcomputer, thereby simplifying a circuit configuration in comparison with the case that the program-supplying source is independently provided. Therefore, the semiconductor integrated circuit of the present invention is appropriate for the cost reduction.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a flow chart showing an example of a boot flow according to Embodiment 2 of the present invention;

FIG. 7 is a diagram showing boot steps at normal boot when the external nonvolatile memory is a NAND flash memory;

FIG. 8 is a diagram showing the boot steps at normal boot when the external nonvolatile memory is a NOR flash memory;

FIG. 9 is a diagram showing the boot steps at normal boot when the external nonvolatile memory is a ROM memory;

FIG. 10 is a diagram showing the boot steps in which the boot is directly performed from the memory card when the external nonvolatile memory is the NAND flash memory;

FIG. 11 is a diagram showing the boot steps in which the boot is directly performed from the NOR flash memory when the external nonvolatile memory is the NOR flash memory;

FIG. 12 is a diagram showing the boot steps when the external nonvolatile memory is the ROM;

DESCRIPTION OF THE PREFERRED EMBODIMENTS

Embodiment 1

A semiconductor integrated circuit according to the present invention is integrated in a single chip and includes two microcomputers which respectively receive electrical power supply from two power sources independently, and a block circuit which blocks a signal input/output between the two microcomputers. A description will be given to a configuration in which each of the two microcomputers has a boot function. Here, the boot function means a function of loading a program from the outside at startup of the microcomputer. Each of the two microcomputers has the boot function. Accordingly, it is not necessary to embed a high-capacity flash memory inside the microcomputer, achieving cost reduction.

Figure 1:
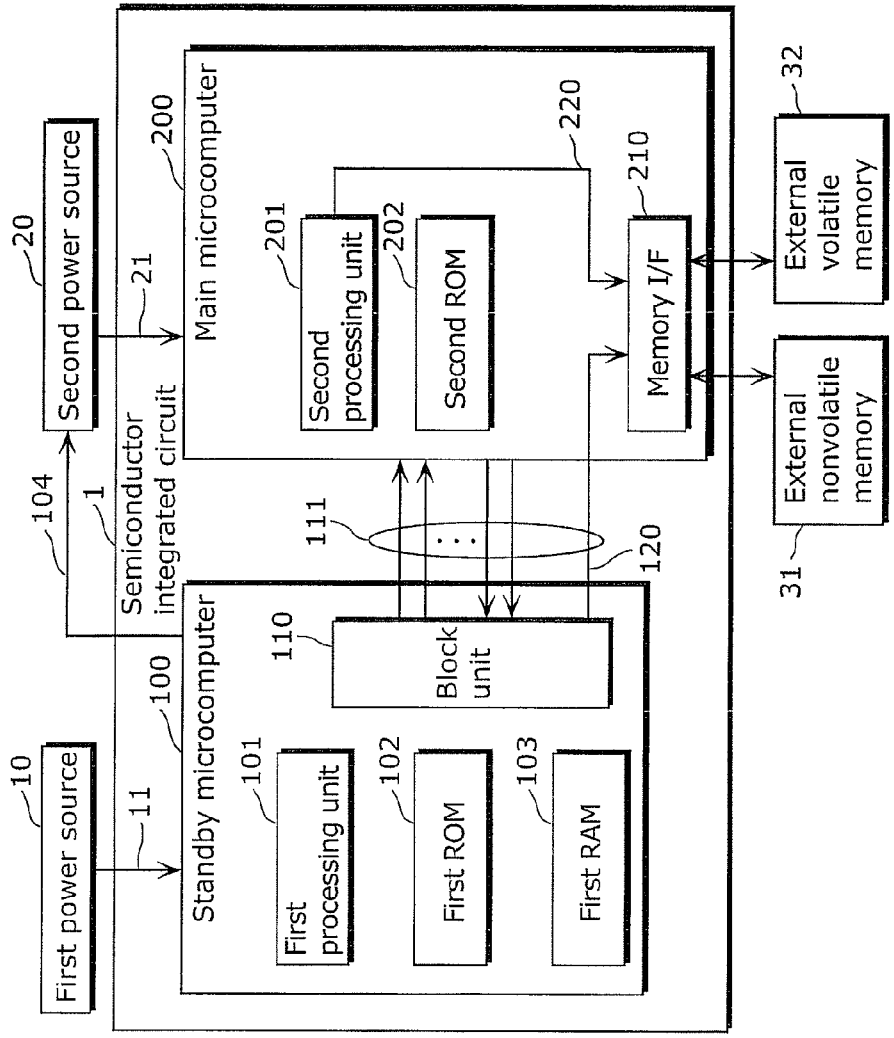
FIG. 1 is a block diagram showing a configuration of a semiconductor integrated circuit and a periphery thereof according to Embodiment 1 of the present application.

FIG. 1 is a block diagram showing a configuration of the semiconductor integrated circuit and a periphery thereof according to Embodiment 1 of the present invention. FIG. 1 shows a semiconductor integrated circuit 1 and its peripheral circuits which include a first power source 10, a second power source 20, an external nonvolatile memory 31, and an external volatile memory 32.

The first power source 10 serves as, for example, a three-terminal regulator to supply a voltage VDD1 (11) to a standby microcomputer 100.

The second power source 20 serves as, for example, the three-terminal regulator to supply a voltage VDD2 (21) to a main microcomputer 200. The second power source 20 is controlled between ON and OFF (alternatively enabled and disabled) by an enable signal 104 output from the standby microcomputer 100.

The external nonvolatile memory 31 stores a program for the standby microcomputer 100 and a program for the main microcomputer 200. In order to differentiate these programs from each other, these are respectively called a first program and a second program, hereinafter. The first program includes an operating system OS and an application program for the standby microcomputer 100. The second program includes an operating system OS and an application program for the main microcomputer 200. The external nonvolatile memory 31 preferably is a NAND flash memory, a NOR flash memory, or a ROM, specifically.

The external volatile memory 32 is a SDRAM. The second program is loaded on the external volatile memory 32 when the main microcomputer 200 is booted, for example, so that the external volatile memory 32 functions as a part of a main memory of the main microcomputer 200.

The semiconductor integrated circuit 1 is integrated in a single chip and includes the standby microcomputer 100 which receives power supply from the first power source 10 and the main microcomputer 200 which receives power supply from the second power source 20 provided independently from the first power source 10.

The standby microcomputer 100 includes a first ROM 102 for storing a first boot program, a first RAM 103, a first processing unit 101 which executes the boot program, and a block unit 110.

Here, the boot program is a program executed when the microcomputer is started up, and is used for loading a program (mainly, a program for loading the operating system (OS)) from the outside into the main memory, and is also called an Initial Program Loader (IPL). In order to differentiate the boot program stored in the first ROM 102 from the boot program stored in the second ROM 202, the former one is called a first boot program while the latter one is called a second boot program, hereinafter.

The first ROM 102 is a part of the main memory subjected to an instruction fetch by the standby microcomputer 100, and stores the first boot program. The first ROM 102 includes a mask ROM, an EEPROM, and other memories, for example, and preferably includes a ROM which is not a NAND flash memory or a NOR flash memory.

The first RAM 103 is a part of the main memory which fetches the instruction from the standby microcomputer 100, and is a SRAM, for example.

The first processing unit 101 is a CPU, and executes the first boot program when the first power source 10 is switched ON so as to switch ON the second power source 20 and to load the first program from the external nonvolatile memory 31 on the first RAM 103, thereby executing the loaded first program. The first processing unit 101 may load the first program on the external volatile memory 32 instead of the first RAM 103.

The block unit 110 blocks various signal lines 111 used for signals input from the standby microcomputer 100 to the main microcomputer 200 while the first power source 10 is switched ON and the second power source 20 is switched off. The term "block" means to forcibly make a level of the signal be to a low level. This avoids a high-level signal to be applied to a gate of a transistor under the condition when the power source is switched off, preventing a transistor from deteriorating its characteristics.

The main microcomputer 200 includes a second ROM 202 which stores the second boot program, a second processing unit 201 which executes the second boot program, and a memory interface 210.

The second ROM 202 is a part of the main memory subjected to the instruction fetch by the main microcomputer 200, and stores the second boot program. The second ROM 202 includes a mask ROM, an EEPROM, and other memories, for example, and preferably includes a ROM which is not the NAND flash memory or the NOR flash memory.

The second processing unit 201 is a CPU and uses the second ROM 202 and the external volatile memory 32 as the main memory. In other words, the second ROM 202 and the external volatile memory 32 are subjected to the instruction fetch. The second processing unit 201 executes the second boot program when the second power source 20 is switched ON so as to load the second program from the external volatile memory 31 on the external volatile memory 32, thereby executing the loaded second program.

A memory interface 210 is connected to the external nonvolatile memory 31 and the external volatile memory 32 both of which are provided outside the chip, and accesses the external nonvolatile memory 31 and the external volatile memory 32 upon receiving access requests from the standby microcomputer 100 and the main microcomputer 200.

The semiconductor integrated circuit 1 according to the embodiment is configured as described above. The operations of the semiconductor integrated circuit 1 will be described.

Figure 2:
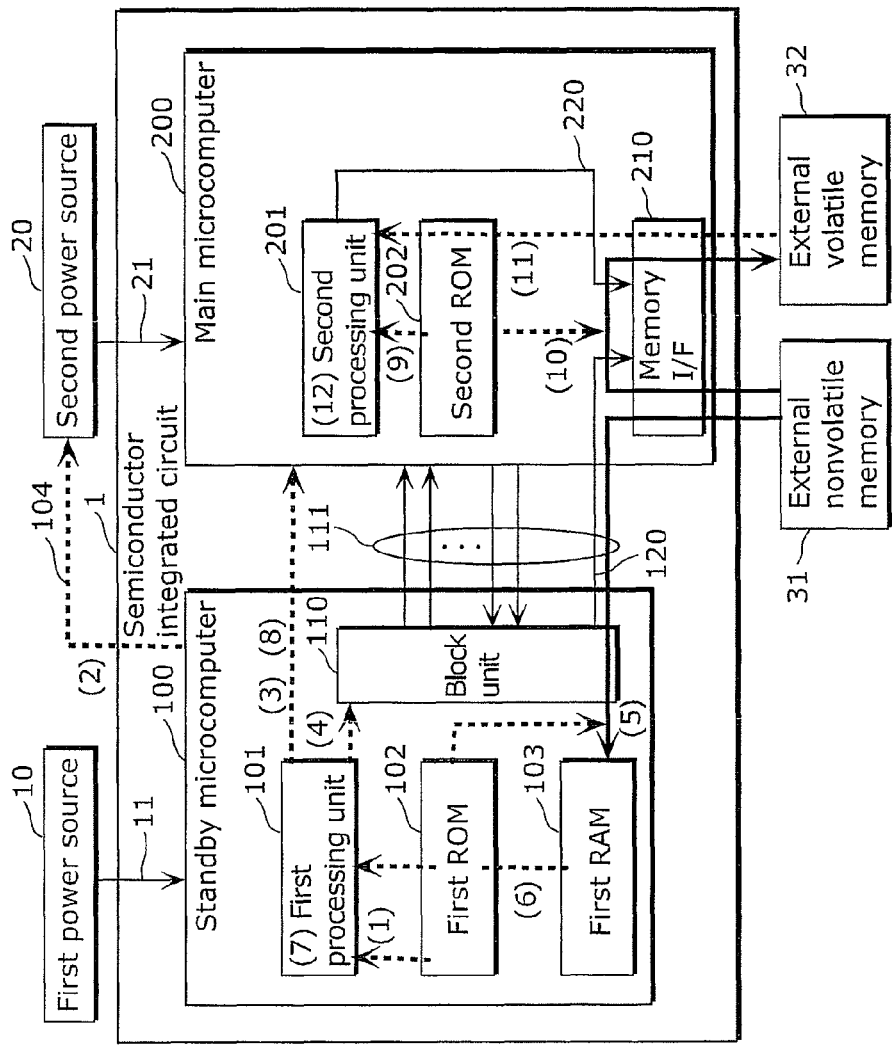
FIG. 2 is an explanatory diagram showing a boot sequence of the semiconductor integrated circuit according to Embodiment 1 of the present invention.

FIG. 2 is an explanatory diagram showing an example of a boot sequence of the semiconductor integrated circuit according to Embodiment 1 of the present invention. Reference numerals (1) to (12) respectively denote steps of the boot sequence. Dotted lines indicate controls according to executions of the first and second boot programs, while heavy lines indicate forwarding routes of the first and second programs. Hereinafter, the operations of the semiconductor integrated circuit will be described along the steps of the boot sequence.

(1) When the first power source 10 is switched ON, the first processing unit 101 initiates the execution of the first boot program stored in the first ROM 102.

(2) The first processing unit 101 executes the first boot program so as to place the second power source 20 to be in power-ON (enabled) state. Immediately after the second power source is switched ON, the main microcomputer 200 is in an instruction-fetch halted state, and the block unit 110 is in the enabled state (blocked state).

(3) The first processing unit 101 executes the first boot program so as to initialize the main microcomputer 200.

(4) The first processing unit 101 executes the first boot program so as to place the block unit 110 to be in a disabled state (termination of the blocked state).

(5) The first processing unit 101 executes the first boot program so as to load the first program from the external nonvolatile memory 31 on the first RAM 103.

(6) The first processing unit 101 initiates the execution of the first program loaded on the first RAM 103.

(7) The first processing unit 101 executes the first program, that is, executes the OS and application programs. The application program includes a function for controlling the ON and OFF state of the second power source 20 and the startup and stop of the main microcomputer 200.

(8) The first processing unit 101 executes the first program so as to change the state of the main microcomputer 200 from a stopped state to a performing state (termination of a reset, sleep, or halt).

(9) The second processing unit 201 initiates the execution of the second boot program stored in the second ROM 202.

(10) The second processing unit 201 loads the second program from the external nonvolatile memory 31 on the external volatile memory 32.

(11) The second processing unit 201 initiates the execution of the loaded second program.

(12) The second processing unit 201 executes the second program (OS and application programs). The application program includes applications for reproducing video and audio data, for example.

As described above, the standby microcomputer 100 and the main microcomputer 200 can be individually booted. A source of the first and second programs both of which are to be loaded is the external nonvolatile memory 31. The standby microcomputer 100 and the main microcomputer 200 share the source.

As described in the above, in the semiconductor integrated circuit according to the present embodiment, the standby microcomputer 100 and the main microcomputer 200 respectively load the first and the second programs at boot time (at starting-up). Accordingly, no flash memory needs to be embedded inside the semiconductor integrated circuit. This enables to reduce cost.

Furthermore, the external nonvolatile memory serving as a source which supplies programs at the time of boot is shared, thereby simplifying a circuit configuration in comparison with a case when a program-supplying source is independently provided. Therefore, the semiconductor integrated circuit of the present invention is appropriate for the cost reduction.

In addition, the external nonvolatile memory serving as the program-supplying source is shared, thereby allowing the memory interface to be shared. While the standby microcomputer is switched ON and the main microcomputer is switched off, power consumption in the memory interface can be reduced.

It should be noted that the standby microcomputer 100 may not include the first RAM 103. In this case, the first processing unit 101 may load the first program on the external volatile memory 32 in the step (5) of the boot sequence. Subsequently, the first processing unit 101 may initiate the execution of the first program loaded on the external volatile memory 32 in the step (6).

Furthermore, the standby microcomputer 100 may include, instead of the first RAM 103, a cache memory serving as a cache of the external volatile memory 32.

Embodiment 2

In the Embodiment 2, a semiconductor integrated circuit which includes a memory interface 210 to which a memory card to be accessed is added will be described. The semiconductor integrated circuit includes a function for updating the first and second programs using the memory card, and a function for performing boot from the memory card, in addition to the functions described in Embodiment 1.

Figure 3:
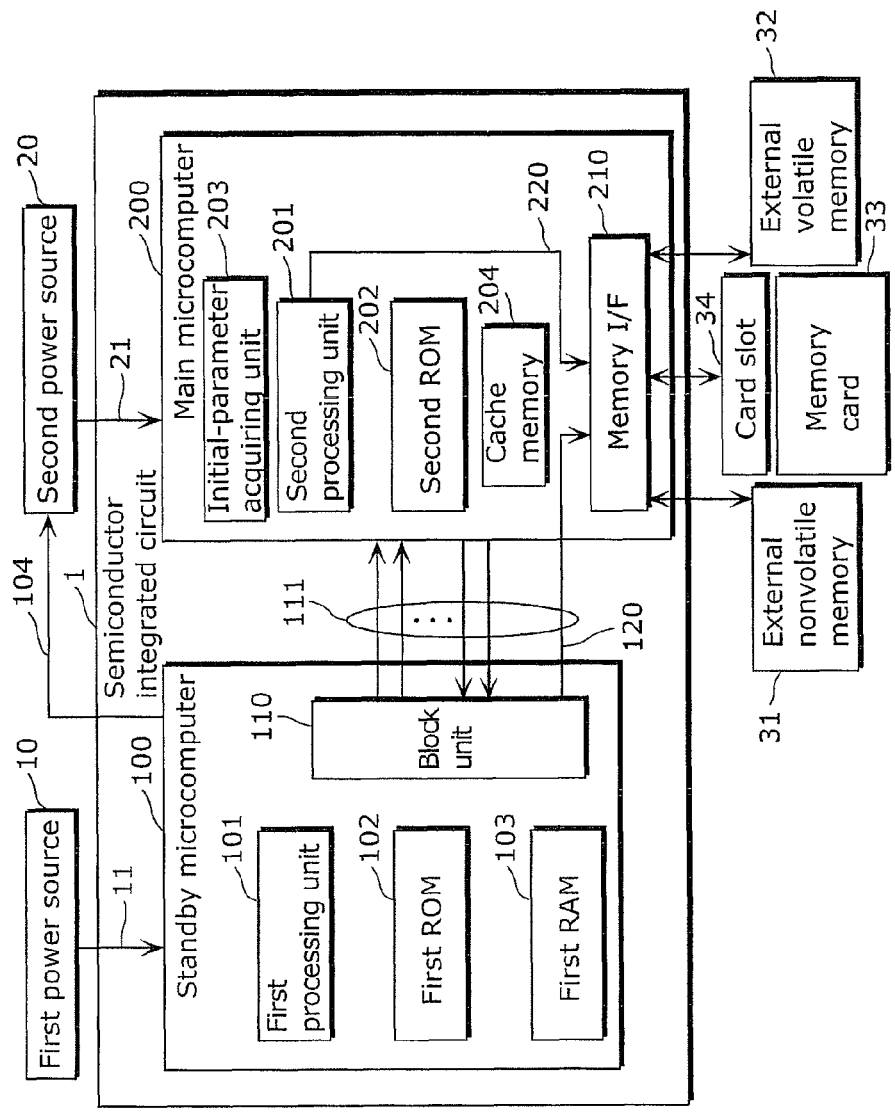
FIG. 3 is a block diagram showing a configuration of a semiconductor integrated circuit and a periphery thereof according to Embodiment 2 of the present invention.

FIG. 3 is a block diagram showing a configuration of the semiconductor integrated circuit and a periphery thereof according to Embodiment 2 of the present application. The semiconductor integrated circuit shown in FIG. 3 is different from that in FIG. 1 in that the memory interface 210 is connected to a card slot 34 and that an initial-parameter acquiring unit 203 and a cache memory 204 are added. Hereinafter, description will be given omitting a function same as that in the previous Embodiment and focusing a function different therefrom.

In addition to the functions described in Embodiment 1, the memory interface 210 in Embodiment 2 accesses a memory card 33 through the card slot 34. That is the different point from Embodiment 1. The memory card is detachably attached to the card slot 34 and includes a nonvolatile memory, and is a SD card, for example. The memory card stores at least one of an updated first program and an updated second program, or at least one of the first program and the second program both of which are to be subjected to debug at a development stage.

The initial-parameter acquiring unit 203 acquires an initial parameter at boot time from the outside, or holds the initial parameter. The initial parameter indicates, for example, whether a source of the second program to be loaded is the external nonvolatile memory 31 or the memory card 33, and is read out by the second boot program. The initial-parameter acquiring unit 203 may include a nonvolatile memory which holds the initial parameter acquired from the outside, select the initial parameter held in the nonvolatile memory and the initial parameter acquired from the outside, and allows the selected initial parameters to be read out by the second boot program.

The cache memory 204 functions as a data cache and an instruction cache of the external volatile memory 32.

The semiconductor integrated circuit according to the embodiment is configured as described in the above. The operation of the semiconductor integrated circuit will be described.

Figure 4:
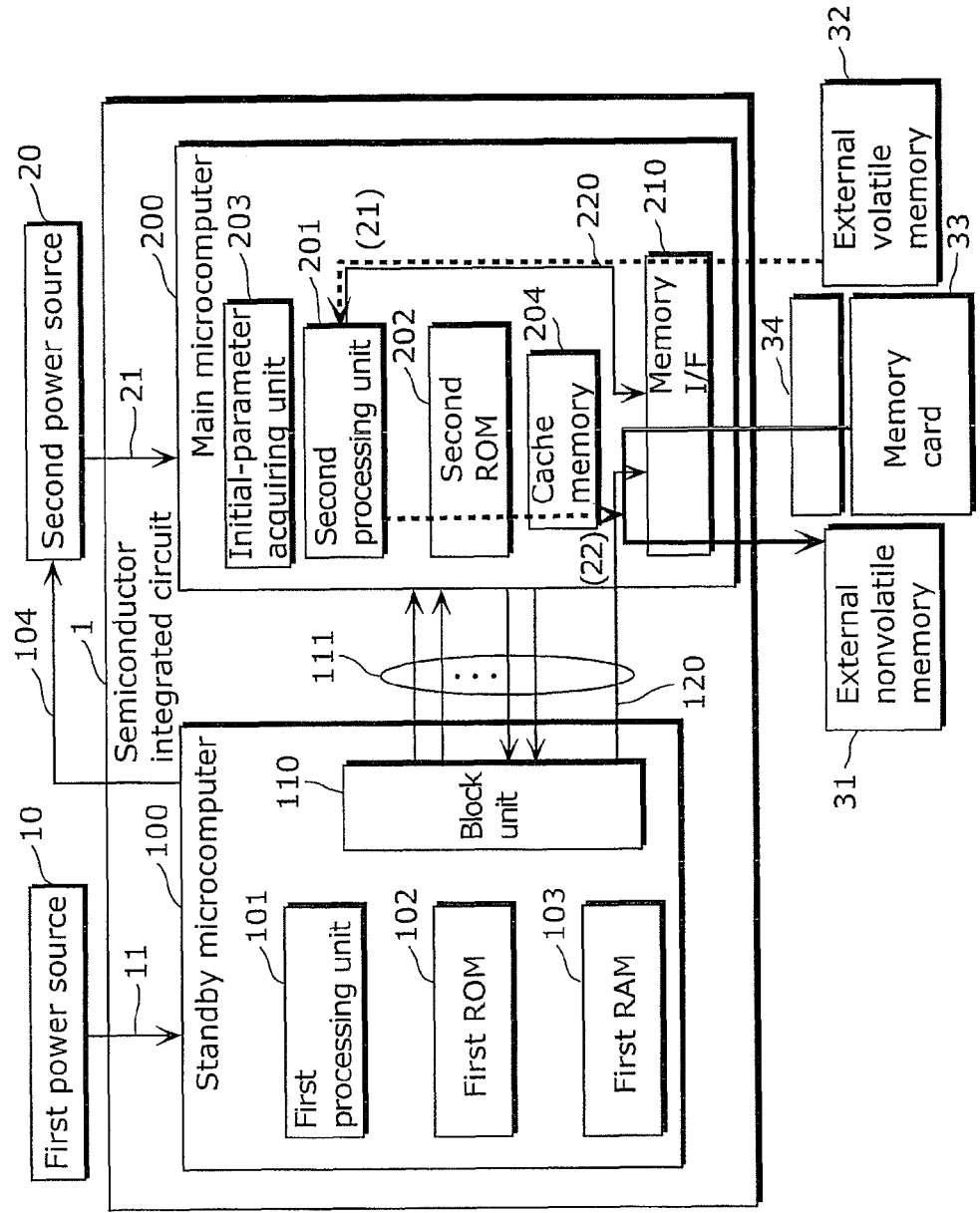
FIG. 4 is an explanatory diagram showing an example of an updated sequence for a program stored in an external nonvolatile memory according to Embodiment 2 of the present invention.

FIG. 4 is an explanatory diagram showing an example of an update sequence for a program stored in the external nonvolatile memory according to Embodiment 2 of the present invention. The update sequence shown in FIG. 4 is used for updating at least one of the first and second programs stored in the external nonvolatile memory 31. The update sequence is executed by executing "a program for updating" in the second program after completion of the boot sequence shown in FIG. 2. At least one of the updated first program and the updated second program is stored in the memory card 33. Reference numerals (21) and (22) in FIG. 4 indicate steps of the update sequence. A dotted line indicates control according to the execution of the second program, while a heavy line indicates a forwarding route of the updated first program and/or the updated second program.

Hereinafter, a performance will be described along steps of the boot sequence.

(21) The second processing unit 201 initiates the execution of "the program for updating" in the second program.

(22) The second processing unit 201 executes the program for updating so as to forward the updated first program and/or the updated second program from the memory card 33 to the external nonvolatile memory 31, thereby making copies of the updated first program and/or the updated second program. The updated first program and/or the updated second program is written over previous versions thereof in the external nonvolatile memory 31. Alternatively, the updated version and the previous version may coexist, and the updated version may be selected at boot time.

As such, the memory card is used to easily update the program stored in the external nonvolatile memory.

Figure 5:
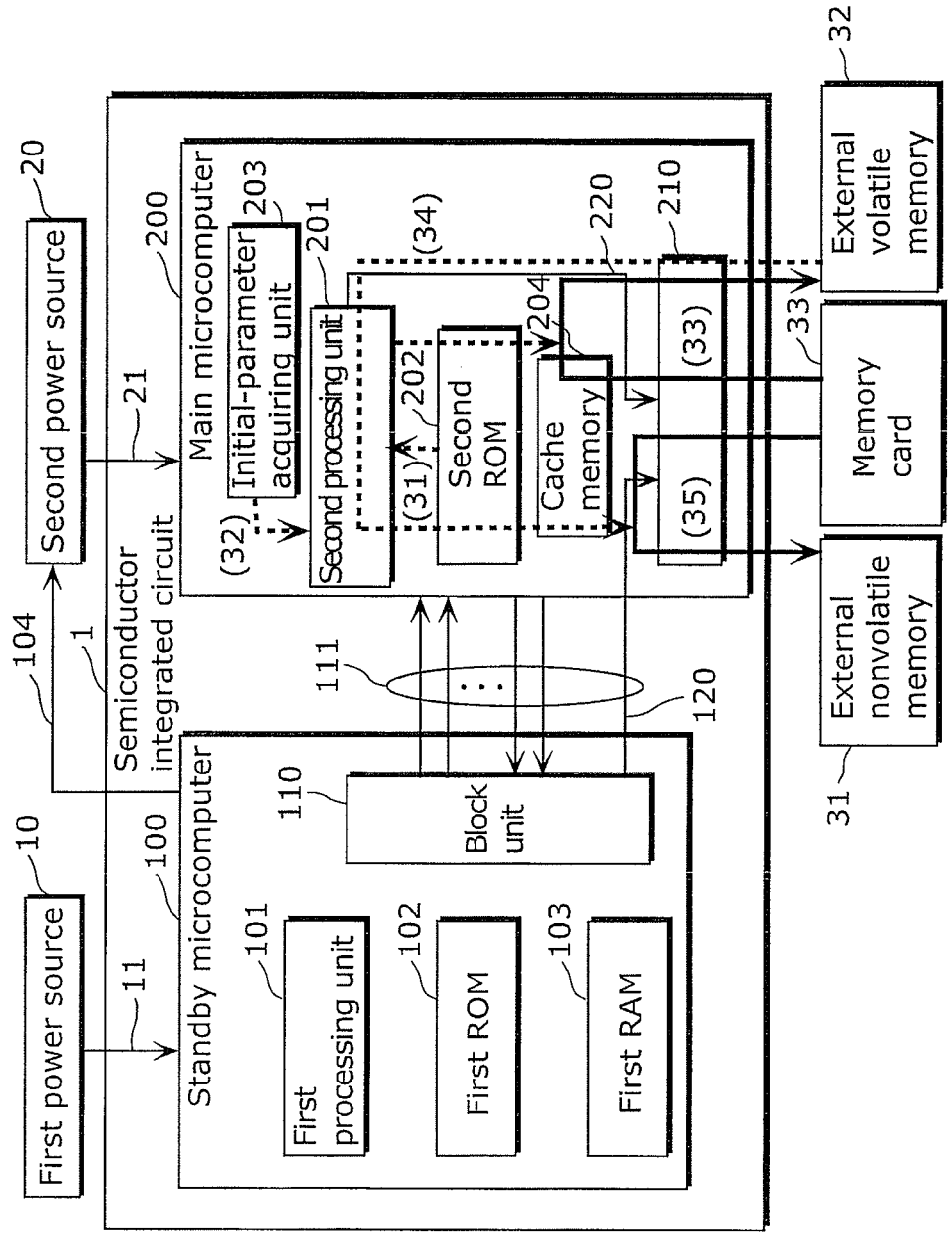
FIG. 5 is an explanatory diagram showing an example of a boot sequence from a memory card according to Embodiment 2 of the present invention.

FIG. 5 is an explanatory diagram showing an example of the boot sequence in which the main microcomputer 200 according to Embodiment 2 of the present invention boots a program from the memory card.

The boot sequence of FIG. 5 is used for loading the second program stored in the memory card 33 on the external volatile memory 32, as an OS and an application program of the main microcomputer 200. The processing according to the boot sequence shown in FIG. 5 is implemented subsequent to the steps (1) to (8) in the boot sequence shown in FIG. 2, instead of the steps (9) to (12) in FIG. 2, by executing the second boot program.

At least updated second program is stored in the memory card 33. The reference numerals (31) to (35) denote the respective steps in the boot sequence of the main microcomputer 200. The dotted lines indicate control by executing the second program, while the heavy lines indicate forwarding routes of the updated first program and/or the updated second program.

Hereinafter, a performance will be described along the steps in the boot sequence.

(31) The second processing unit 201 initiates the execution of the second boot program.

(32) The second processing unit 201 executes the second boot program so as to read out an initial value from the initial-parameter acquiring unit 203, thereby determining the source of the second program. For example, the second processing unit 201 determines that the source of the second program is the external nonvolatile memory 31, when the initial parameter is a first value. In this case, the processing same as those in and after the step (10) in FIG. 2 is implemented. Meanwhile, the second processing unit 201 determines that the source of the second program is the memory card 33, when the initial parameter is a second value. In this case, a processing described below is implemented.

(33) The second processing unit 201 executes the second boot program so as to load the updated second program from the memory card 33 on the external volatile memory 32.

(34) The second processing unit 201 initiates the execution of the updated second program from the external volatile memory 32.

(35) The second processing unit 201 executes the updated second program so as to load the updated second program from the memory card 33 on the external nonvolatile memory 31. The external nonvolatile memory 31 is overwritten with the updated second program. Alternatively, the updated version and the previous version may coexist, instead of the overwriting.

As described above, the boot function from the memory card can easily be realized in the main microcomputer 200.

When the updated first program is stored in the memory card, the second processing unit 201 may require, subsequent to the step (35), the first processing unit 101 to update the first program. In response to the above, the first processing unit 101 may forward the first program from the memory card 33 or the external nonvolatile memory 31 to the first RAM 103 to update the first program in the first RAM 103. With this processing, the standby microcomputer 100 can be easily rebooted from the memory card along with the main microcomputer 200.

Next, the boot sequence of the semiconductor integrated circuit according to Embodiment 2 of the present invention will be described with reference to a flow chart.

FIG. 6 is a flow chart showing an example of the boot flow according to Embodiment 2 of the present invention. As shown in FIG. 6, when the first power source 10 is switched ON, the first processing unit 101 initiates the execution of the first boot program stored in the first ROM 102 (Step S10). The first processing unit 101 executes the first boot program so as to, first, determines which one of a normal boot or an SD boot should be implemented (Step S11). Here, the normal boot means to implement a boot from the external nonvolatile memory 31. Specifically, it means to load the first program from the external nonvolatile memory 31. The SD boot means to implement the boot from the memory card (here, an SD card). Specifically, it means to load the first program from the memory card 33.

When it is determined to implement the normal boot, the first processing unit 101 reads out a startup selection initial value to determine that the external nonvolatile memory 31 is the NAND flash memory or the NOR flash memory (Step S12). The startup selection initial value is, for example, a value set as a fixed value in the standby microcomputer 100 or a value supplied from the outside and indicates at least a type of the external nonvolatile memory 31 (NAND or NOR). The determination is needed, since an access is required on a block basis for the NAND, whereas the access is possible on one byte basis at minimum for the NOR.

When the external nonvolatile memory 31 is the NAND flash memory, the first processing unit 101 issues, to the external nonvolatile memory 31, an access request to conduct an access on a block basis so as to forward the first program from the external nonvolatile memory 31 to the first RAM 103 (Step S13). Details of the step S13 may be same with those in the steps (2) to (5) in FIG. 2.

When the external nonvolatile memory 31 is the NOR flash memory, the first processing unit 101 issues, to the external nonvolatile memory 31, the access request to conduct an access on one byte basis at minimum (for example, on four bytes basis) so as to forward the first program from the external nonvolatile memory 31 to the first RAM 103 (Step S14). Details of the step S14 may be same with those in the steps (2) to (5) in FIG. 2.

After completion of the normal boot of the standby microcomputer 100, the second processing unit 201 determines the startup selection initial value in the main microcomputer 200, and determines a target of the instruction fetch (Step S21). The start-up initial value is, for example, a value set in the main microcomputer 200 as the fixed value or a value supplied from the outside, and at least indicates that the target of the instruction fetch at the time of startup is the second ROM 202 or the external nonvolatile memory 31 of the NOR flash memory.

When the target of the instruction fetch is the second ROM 202, the second processing unit 201 initiates the execution of the second boot program stored in the second ROM 202 (Step S22). The second processing unit 201 first executes the second boot program so as to determine which one of the normal boot or the SD boot is implemented (Step S23). The normal boot in this case means to implement the boot from the external nonvolatile memory 31, specifically, to implement the load of the second program from the external nonvolatile memory 31 serving as the NAND flash memory. The SD boot means to implement the boot from the memory card (here, the SD card), specifically to implement the load of the second program from the memory card 33.

When it is determined that the normal boot is to be implemented, the second processing unit 201 issues, to the external nonvolatile memory 31, the access request to implement the access on a block basis so as to forward the second program to the external volatile memory 32 through the cache memory 204 from the external nonvolatile memory 31 (Steps S24 and S25). Details of the step S23 may be same with those in the steps (10) and (11) in FIG. 2.

When the target of the instruction fetch is the external nonvolatile memory 31 of the NOR flash memory, the second processing unit 201 initiates an instruction fetch to the external nonvolatile memory 31, and initiates the execution of the second boot program stored in the external nonvolatile memory 31 (Step S26). In this case, it is assumed that the external nonvolatile memory 31 stores the second boot program. The NOR flash memory can be accessed on a byte basis. Accordingly, the second processing unit 201 executes the second boot program by directly fetching the instruction of the second boot program from the external nonvolatile memory 31. The second processing unit 201 executes the second boot program so as to forward the second program from the external nonvolatile memory 31 to the external volatile memory 32 (Step S27).

As in the steps S26 and S27, the main microcomputer 200 can implement the boot processing from the external nonvolatile memory 31 serving as the NOR flash memory.

On the other hand, when it is determined that the SD boot should be implemented in the step S11, the first processing unit 101 starts up the main microcomputer 200. For example, the steps (2), (3), and (8) in FIG. 2 are conducted. In this case, the second processing unit 201 of the main microcomputer 200 determines that the SD boot should be implemented in the step S23, and executes the second boot program in the second ROM 202 so as to forward the second program from the memory card 33 to the external volatile memory 32 through the cache memory 204 (Steps S28 and S29). Furthermore, the second processing unit 201 requires the SD boot of the first processing unit 101. The first processing unit 101 forwards the first program from the memory card 33 to the first RAM 103 (Step S15).

In the above flow of the boot sequence, either the normal boot or the SD boot in the standby microcomputer 100 can be selected, while one of the normal boot, the boot from the NOR external nonvolatile memory 31, and the SD boot can be selected in the main microcomputer 200.

It should be noted that the boot may be implemented from the NOR external nonvolatile memory 31 in the standby microcomputer 100.

Furthermore, the external nonvolatile memory 31 may be the NOR instead of the NAND in the step S24.

Hereinafter, steps of the normal boot according to the present embodiment will be described by types of the external nonvolatile memory 31.

FIG. 7 is a diagram showing the boot steps when the external nonvolatile memory is the NAND flash memory.

The term "STM" in FIG. 7 indicates the standby microcomputer 100, while "BE" is short for a back-end and indicates the main microcomputer 200. The term "NAND (something) indicates that the external nonvolatile memory 31 is the NAND flash memory. The terms like "STMprog.", "BEboot", or "BEprog." in the parenthesis indicate the respective programs stored in the external nonvolatile memory 31. The term "STMprog" indicates the first program to be loaded in the standby microcomputer 100, while "BEprog" indicates the second program to be loaded in the main microcomputer. The term "Boot first ROM" indicates to execute a boot program in the first ROM 102. As for terms "Boot second ROM" and "Boot ROM", the same definition can be applied with that in the above, except for the difference in memory to be booted. The term "Execute the first RAM" indicates to execute the program in the first RAM 103. As for terms "Execute second RAM" and "Execute SDRAM", the same definition can be applied with that in the above, except for the difference in memory to be booted.

The reference numerals (1) to (5) in the middle and the right columns in FIG. 7 respectively indicate the boot steps for the STM (standby microcomputer 100) and the BE (main microcomputer 200).

FIG. 7 shows the case that the external nonvolatile memory 31 is the NAND flash memory. FIG. 7 also shows the steps (a), (b), and (c) implemented in the respective STM and BE at the time of (A). Here, (A) denotes "at normal boot time". The reference (a), (b), and (c) respectively denote: the step of implementing the boot as a normal setting function; the step of making a copy of a program from the SD card to the flash memory (external nonvolatile memory 31); and the step of loading the program from the SD card to the SDRAM (external volatile memory 32) so as to execute the program.

FIG. 8 is a diagram showing the boot steps at normal boot time when the external nonvolatile memory is the NOR flash memory. The meanings of each of the descriptions in FIG. 8 are the same with those in FIG. 7. A term "boot NOR directly" means that the second processing unit 201 directly fetches an instruction from the NOR external nonvolatile memory 31 so as to execute the instruction.

FIG. 8 shows the case when the external nonvolatile memory 31 is the NOR flash memory. FIG. 7 also shows the steps (a), (b), and (c) implemented in the respective STM and BE at the time of (A). Here, (A) denotes "at normal boot time". The reference (a), (b), and (c) respectively denote: the step of implementing the boot as the normal setting function; the step of making a copy of a program from the SD card to the flash memory (external nonvolatile memory 31); and the step of loading the program from the SD card to the SDRAM (external volatile memory 32) so as to execute the program.

FIG. 9 is a diagram showing the boot steps when the external nonvolatile memory is a ROM memory. The ROM described in this Embodiment is a mask ROM, an EEPROM, and the like, but the flash memory.

FIG. 9 shows the case when the external nonvolatile memory 31 is the ROM memory. FIG. 9 also shows the steps (a), (b), and (c) implemented in the respective STM and BE at the time of (A). Here, (A) denotes "at normal boot time". The reference (a), (b), and (c) respectively denote: the step of implementing the boot as the normal setting function; the step of making a copy of a program from the SD card to the flash memory (external nonvolatile memory 31); and the step of loading the program from the SD card to the SDRAM (external volatile memory 32) so as to execute the program.

FIG. 10 is a diagram showing the boot steps using the memory card when the external nonvolatile memory is the NAND flash memory. FIG. 10 shows the steps (a) and (b) in the case of (B). Here, (B) denotes a condition in which the boot is implemented using the SD card. The references (a) and (b) respectively denote: the step of forwarding a program from the SD card to the external nonvolatile memory 31 and the external volatile memory 32; and the step of forwarding the program from the SD card to the external volatile memory 32.

FIG. 11 is a diagram showing the boot steps using the memory card when the external nonvolatile memory is the NOR flash memory. FIG. 11 shows the steps (a) and (b) in the case of (B). Here, (B) denotes a condition in which the boot is implemented using the SD card. The references (a) and (b) respectively denote: the step of forwarding a program from the SD card to the external nonvolatile memory 31 and the external volatile memory 32; and the step of forwarding the program from the SD card to the external volatile memory 32.

FIG. 12 is a diagram showing the boot steps using the memory card when the external nonvolatile memory is the ROM. FIG. 12 shows the steps (a) and (b) in the case of (B). Here, (B) denotes a condition in which the boot is implemented using the SD card. The references (a) and (b) respectively denote: the step of forwarding a program from the SD card to the external nonvolatile memory 31 and the external volatile memory 32; and the step of forwarding the program from the SD card to the external volatile memory 32.

As described above, the semiconductor integrated circuit 1 according to the present embodiment realizes the cost reduction, is capable of using various types of external nonvolatile memories 31, and is further capable of using the boot function and the updating function both of which apply the memory card.

Figure 13:
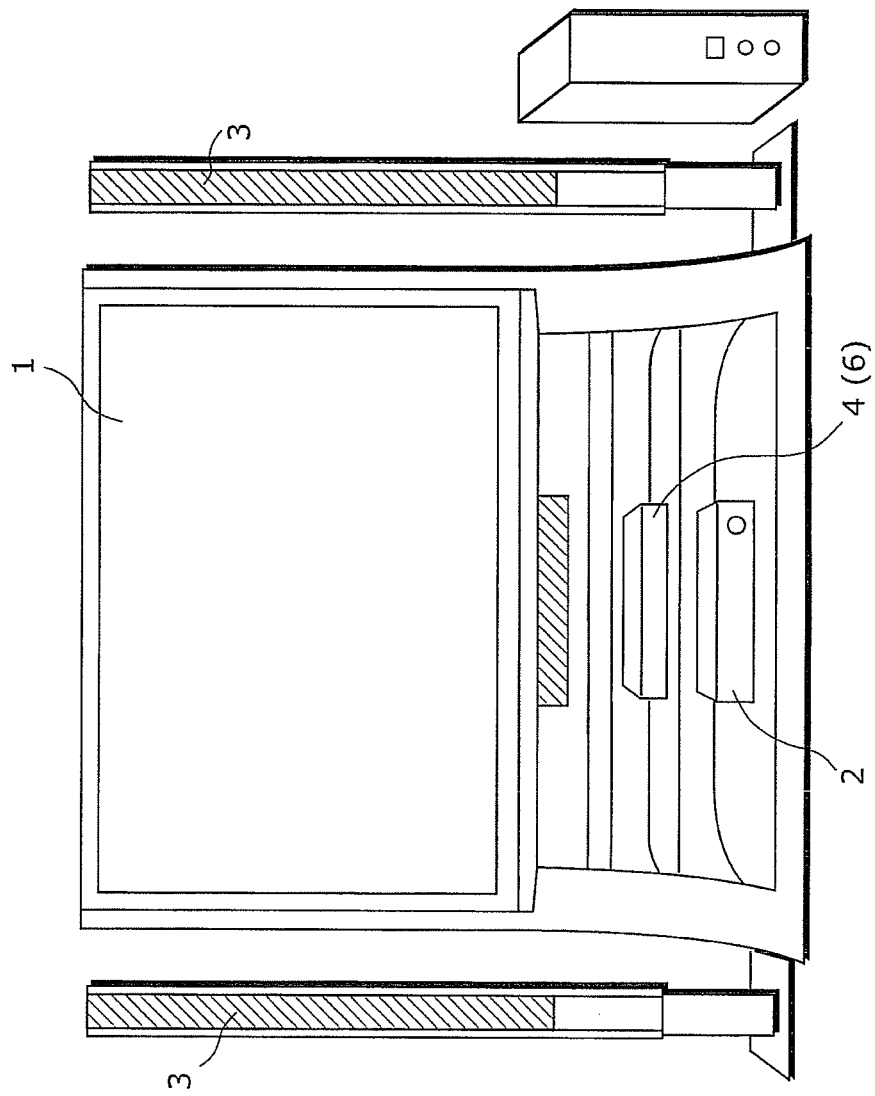
FIG. 13 shows an appearance of a television receiver.
Figure 14:
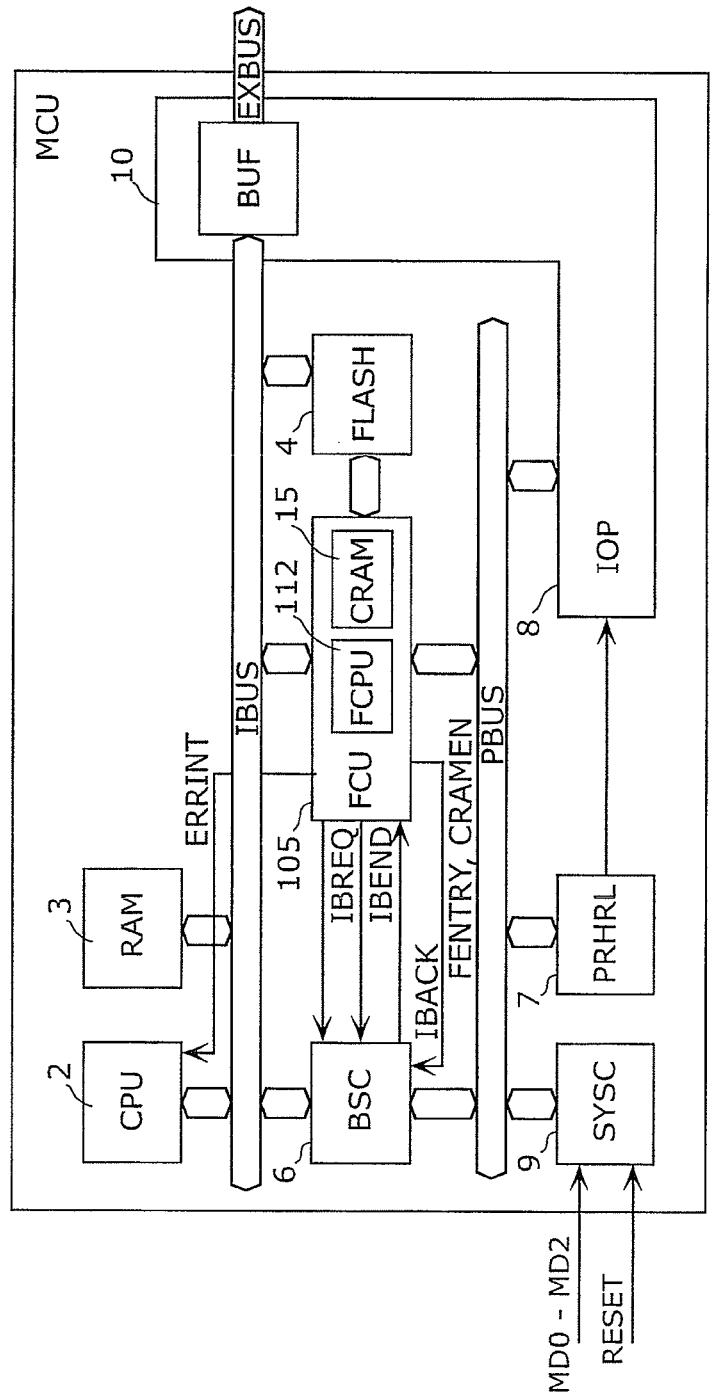
FIG. 14 is a block diagram showing a configuration of a microcomputer according to a conventional technique.

FIG. 13 shows an appearance of a television receiver. The television receiver includes the semiconductor integrated circuit according to Embodiment 1 or Embodiment 2. The standby microcomputer 100 controls the entire of the television receiver upon receiving remote operation by a user. The main microcomputer 200 includes, for example, a function in which digital broadcasting is reproduced by executing the second program, for example.

Although the case in which the semiconductor integrated circuit according to Embodiment 1 or Embodiment 2 is applied to the television receiver which receives the digital broadcasting is described, the semiconductor integrated circuit is applicable to any apparatuses which receive the digital data. The semiconductor integrated circuit may be applied to an optical disc recorder which receives and records therein digital data, an optical disc player which reads out digital data from an optical disc and reproduces the digital data, and other apparatuses. The optical disc includes a Blu-ray Disc (BD) and a Digital Versatile Disc (DVD). Here, a digital data recorder and a digital data player may be used both of which use a semiconductor memory card instead of the optical disc.

The embodiments described in the present specification are merely examples in all respects, and should not be considered to be restrictive. The scope of the present invention is defined not by the above description but by the scope of claims, and includes meaning equal to the scope of claims and all modifications within the scope of claims.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is suitable to semiconductor integrated circuits which includes a main CPU and a sub CPU, in particular, to a semiconductor integrated circuit provided in a television receiver, a video and audio reproducing apparatus, a video and audio recording apparatus, or other apparatuses.

What is claimed is:

1. A single-chip semiconductor integrated circuit comprising:
a standby microcomputer which receives power supply from a first power source;
a main microcomputer which receives power supply from a second power source independent from the first power source; and
a block circuit which blocks a signal input from said standby microcomputer to said main microcomputer when the first power source is switched ON and the second power source is switched OFF,
wherein said standby microcomputer includes:
a first Read Only Memory (ROM) which stores a first boot program; and
a first processing unit configured to execute the first boot program, said main microcomputer includes:
  a second ROM which stores a second boot program; and
  a second processing unit configured to execute the second boot program,
said first processing unit is configured to execute the first boot program when the first power source is switched ON so as to switch ON the second power source and to load the first program from an external nonvolatile memory, and to execute the loaded first program, and
said second processing unit is configured to execute the second boot program when the second power source is switched ON so as to load the second program from the external nonvolatile memory, and to execute the loaded second program.

2. The single-chip semiconductor integrated circuit according to claim 1,
  wherein said main microcomputer includes a memory interface which receives the power supply from the second power source,
  said memory interface is connected to the external nonvolatile memory outside said single-chip semiconductor integrated circuit and to an external volatile memory outside said single-chip semiconductor integrated circuit, and
  the external nonvolatile memory stores the first program and the second program which are to be loaded.

3. The single-chip semiconductor integrated circuit according to claim 2,
  wherein said standby microcomputer includes a first Random Access Memory (RAM) which is volatile,
  said first processing unit is configured to execute the first boot program so as to load the first program from the external nonvolatile memory to the first RAM through said memory interface, and
  said second processing unit is configured to execute the second boot program so as to load the second program from the external nonvolatile memory to the external volatile memory through said memory interface.

4. The single-chip semiconductor integrated circuit according to claim 3,
  wherein said first processing unit is configured to control an ON/OFF state of the second power source and startup/stop of said main microcomputer by:
  initiating the execution of the first boot program when the first power source is switched ON;
  switching ON the second power source;
  stopping said main microcomputer;
  placing said block circuit in an enabled state;
  loading the first program;
  initiating the execution of the loaded first program; and
  executing the first program.

5. The single-chip semiconductor integrated circuit according to claim 3,
  wherein the external nonvolatile memory is a NAND flash memory, and
  said first processing unit is configured to issue, to said memory interface, a read command to read out the first program from the external nonvolatile memory on a block basis so as to load the first program.

6. The single-chip semiconductor integrated circuit according to claim 3,
  wherein the external nonvolatile memory is a NOR flash memory, and
  said first processing unit is configured to issue, to said memory interface, a read command to read out the first program from the external nonvolatile memory on plural-bytes basis so as to load the first program.

7. The single-chip semiconductor integrated circuit according to claim 3,
  wherein said memory interface is further connected to a memory card,
  the memory card stores at least one of an updated first program and an updated second program, and
  said second processing unit is configured to execute the second program so as to make a copy of at least one of the updated first program and the updated second program from the memory card to the external nonvolatile memory.

8. The single-chip semiconductor integrated circuit according to claim 3,
  wherein said memory interface is further connected to a memory card,
  the memory card stores at least one of an updated first program and an updated second program, and
  said first processing unit is configured to execute the first program so as to make a copy of at least one of the updated first program and the updated second program from the memory card to the external nonvolatile memory.

9. The single-chip semiconductor integrated circuit according to claim 3,
  wherein said memory interface is further connected to a memory card,
  the memory card stores at least one of an updated first program and an updated second program,
  said main microcomputer further includes an initial-parameter acquiring unit configured to acquire an initial parameter for boot, and
  said second processing unit is configured to execute the second boot program when the initial parameter is a first value so as to load the second program from the external nonvolatile memory to the external volatile memory through said memory interface, and to execute the second boot program when the initial parameter is a second value so as to load the updated second program from the memory card to the external volatile memory through said memory interface.

10. The single-chip semiconductor integrated circuit according to claim 9,
  wherein said memory interface is connectable to either a NAND flash memory or a NOR flash memory, as the external nonvolatile memory, and
  said second processing unit is further configured to execute the second boot program when the initial parameter is the second value, so as to make a copy of at least one of the updated first program and the updated second program from the memory card to the external volatile memory through said memory interface.

11. The single-chip semiconductor integrated circuit according to claim 3,
  wherein said memory interface is further connected to a memory card,
  the memory card stores at least one of an updated first program and an updated second program,
  said main microcomputer includes an initial-parameter acquiring unit configured to acquire an initial parameter for boot, and
  said second processing unit is configured to determine whether a loading source of the second program is the external nonvolatile memory or the memory card, and to determine whether the nonvolatile memory is a NAND flash memory or a NOR flash memory, according to a value of the initial parameter, so as to load the second program based on the determination result.

12. The single-chip semiconductor integrated circuit according to claim 2,
  wherein said main microcomputer includes said memory interface,
  said memory interface is connected to the external nonvolatile memory outside said single-chip semiconductor integrated circuit and the external volatile memory outside said single-chip semiconductor integrated circuit,
  said first processing unit is configured to execute the first boot program so as to load the first program from the external nonvolatile memory to the external volatile memory, and
  said second processing unit is configured to execute the second boot program so as to load the second program from the external nonvolatile memory to the external volatile memory.

13. A television comprising
  said single-chip semiconductor integrated circuit according to claim 1,
  wherein said main microcomputer executes the second program so as to reproduce a digital broadcasting.

* * * * *